(12) United States Patent
Dietrich

(10) Patent No.: US 6,460,890 B2
(45) Date of Patent: Oct. 8, 2002

(54) ARRANGEMENT FOR A BELT LEVEL ADJUSTER OF A SAFETY BELT SYSTEM

(75) Inventor: Guenter Dietrich, Freiberg (DE)

(73) Assignee: Dr. Ing. h.c.F. Porsche AG, Stuttgart (DE)

(*) Notice: Subject to any disclaimer, the term of this patent is extended or adjusted under 35 U.S.C. 154(b) by 10 days.

(21) Appl. No.: 09/803,362

(22) Filed: Mar. 12, 2001

(65) Prior Publication Data
US 2002/0060452 A1 May 23, 2002

(30) Foreign Application Priority Data
Mar. 11, 2000 (DE) .......................... 100 11 908

(51) Int. Cl.$^7$ .......................... B60R 22/20; B60R 22/28
(52) U.S. Cl. ..................... 280/801.2; 280/805; 297/472
(58) Field of Search .............................. 280/801.2, 805, 280/808; 297/470, 471, 472, 483

(56) References Cited

U.S. PATENT DOCUMENTS

| | | |
|---|---|---|
| 4,872,704 A | 10/1989 | Biller et al. |
| 5,529,344 A | 6/1996 | Yasui et al. |
| 5,769,456 A | 6/1998 | Juchem et al. ............... 280/808 |
| 5,791,687 A | 8/1998 | Gotou et al. ................ 280/805 |
| 6,032,982 A | 3/2000 | Pakulsky et al. |
| 6,050,631 A * | 4/2000 | Suzuki et al. ............... 280/751 |
| 6,106,012 A * | 8/2000 | Boegge et al. .............. 280/805 |

FOREIGN PATENT DOCUMENTS

| | | |
|---|---|---|
| DE | 43 41 119 | 6/1995 |
| DE | 295 19 483 | 5/1996 |
| DE | 196 51 092 | 7/1997 |
| DE | 196 03 367 | 8/1997 |
| EP | 0 927 668 | 7/1999 |

* cited by examiner

Primary Examiner—Peter C. English
(74) Attorney, Agent, or Firm—Crowell & Moring LLP

(57) ABSTRACT

In order to cause a deformation or a yielding, in the event of a head impact onto a safety belt system of a passenger vehicle, a deformation element is interposed which deforms plastically and absorbs energy. So that an exchange of numerous parts is avoided, an arrangement for a belt level adjuster is configured so that after a head impact, only the deformation element needs to be exchanged.

20 Claims, 6 Drawing Sheets

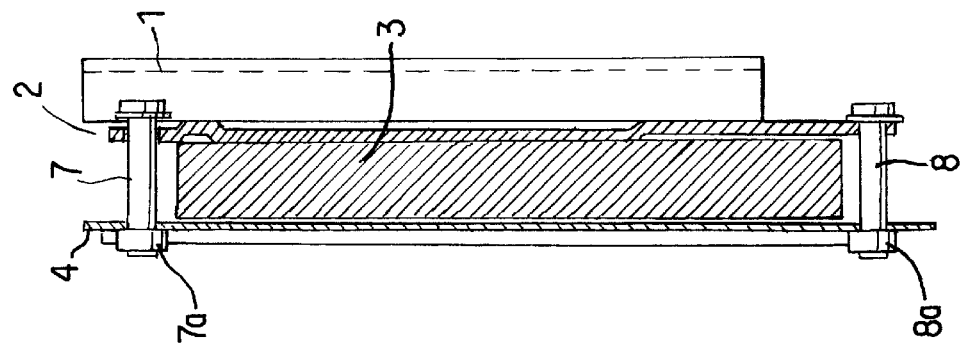
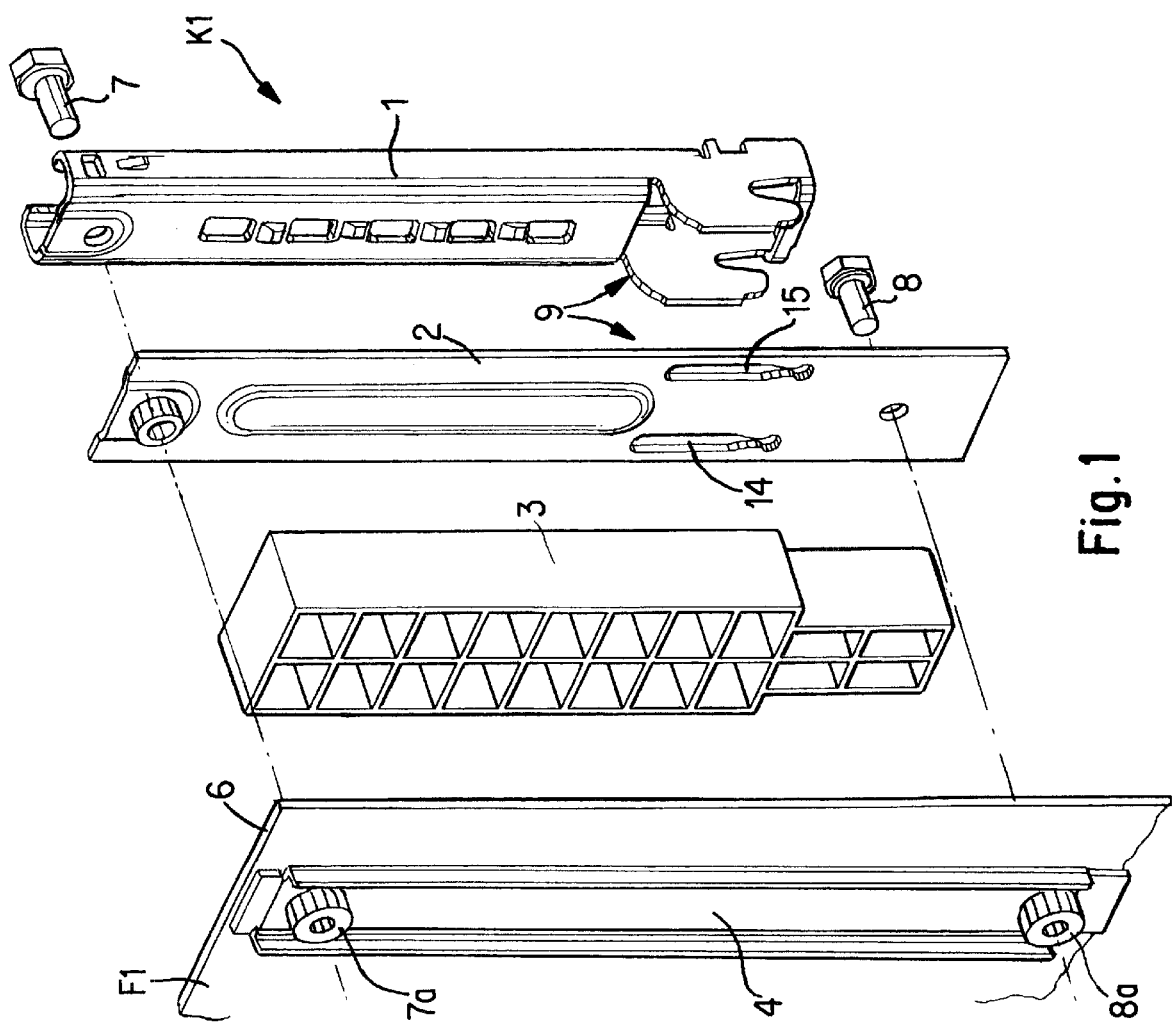

ARRANGEMENT FOR A BELT LEVEL ADJUSTER OF A SAFETY BELT SYSTEM

BACKGROUND AND SUMMARY OF THE INVENTION

This application claims the priority of German Patent Document No. 100 11 908.5, filed in Germany, Mar. 11, 2000, the disclosure of which is expressly incorporated by reference herein.

The invention relates to an arrangement for a belt level adjuster of a safety belt system which adjuster is arranged in a column or pillar of a vehicle, such as a B or C column or pillar of a passenger car and a deformation element is arranged between a detent rail of the belt system and the column.

From German Patent Document DE 295 19 483 U1, an arrangement is known for a belt level adjuster of a safety belt system in a motor vehicle which is fastened by way of a detent rail by means of a deformation element on a column of a vehicle body. Furthermore, from German Patent Document DE 43 41 119 A1 (corresponding U.S. Pat. No. 5,769,456), a preassembled carrier unit for operating parts of a safety belt system is known, which receives the operating parts of the belt system and, on the whole, can be fastened on a column of the vehicle body. In addition, from German Patent Document DE 196 51 092 A1 (corresponding U.S. Pat. No. 5,791,687), a safety belt system for a vehicle is known which forms an anchoring rail for the belt arrangement which, by way of screws, is connected with a column wall of the vehicle body and bases the screw in an impact absorption element. In an impact situation, this element will deform and plastically absorb impact energy.

It is an object of the invention to provide an arrangement for a safety belt system which can be connected with a vehicle column and can be exchanged by a simple mounting and demounting method and, in the event of a head impact, can absorb energy well, the number of parts being low which have to be exchanged after a head impact.

According to the invention, this object is achieved by an arrangement for a belt level adjuster of a safety belt system, which adjuster is arranged in a column of a vehicle. A deformation element is arranged between a detent rail of the belt system and the column, wherein the detent rail is supported by a carrier plate with the deforming element held between the carrier plate and a column wall of the vehicle body by way fastening plate. This fastening plate, in a mounted operating position is arranged resting against a wall surface of the column wall facing away from an interior column wall and, in a head impact position, is moved away from this wall surface of the column wall.

Principal advantages achieved by the invention are that, as a result of the construction of the arrangement such that the detent rail with a carrier plate is held by a deformation element on a column wall of the vehicle body by way of a fastening plate, only the deformation element is damaged in the event of a head impact. The reason is that, in the mounted operating position, the fastening plate is arranged to be resting on a surface of the column wall which faces away from the interior wall of the column and, in a head impact position, the fastening plate is arranged to be detached from this surface of the column wall.

In order to achieve the above described advantages, preferred embodiments of the invention provide that the detent rail with the carrier plate is connected by way of continuous screws to the column wall, and the the detent rail is connected to the carrier plate only by way of at least one hook-in connection. The screws are screwed into weld nuts on the fastening plate. Thus, in the event of a head impact onto the belt level adjuster, the connection screws with the fastening plate can be displaced in an unhindered manner into a clearance of the column. Damage to the column wall of the vehicle body structure is thereby largely avoided, so that only the deformation element has to be exchanged after a head impact.

So that the detent rail can be optionally assembled with a mechanical or electrical level adjuster in a fast and simple manner, the carrier plate, that is, the so-called adapter plate, is constructed with different receiving devices for the detent rail. Thus, in the case of a mechanically operable belt level adjuster, the adapter plate is constructed with side-by-side longitudinal slots and engages as a hook-in connection with protruding hooks on the web of the detent rail. Furthermore, the carrier plate or the adapter plate for an electric belt level adjuster, as a hook-in connection, can have at least one key-shaped opening at the lower end, which opening engages with at least one pin element on the web of the detent rail and the pin element has an end-side detent head.

As a result of the fact that a separation takes place between the linkage of the belt level adjuster and the body shell by means of an interposed adapter plate, it is possible to equip a vehicle series with different existing belt level adjuster systems. With respect to its basic equipment, a vehicle can be equipped with a cost-effective system. This system will then, for example, have a fastening with one screw point and a hook-in solution or a connection by way of two screw point.

In the case of higher-quality vehicle equipment according to certain preferred embodiments of the invention, an electric belt level adjusting system can be installed. In this system, for example, one screw point and a hook-in solution with a key-shaped opening can be used.

According to certain preferred embodiments of the invention, the deformation element consists of a plastically deformable rib body. The ribs extend approximately at a right angle with respect to the interior column wall plate and the carrier plate and are spaced with respect to one another, and hollow spaces form between the ribs. Furthermore, the deformation element can also consist of a plastically deformable honeycomb body.

According to certain preferred embodiments of the invention, the deformation element can be arranged to be either clamped in between the carrier plate and the fastening plate or the column wall, or it can be held on the fastening screws by way of sleeve-type receiving devices molded to the top and to the bottom.

In addition to being fastened by way of the screws, the fastening plate can be fixed by means of a face-side and/or lateral lug or lugs to the column wall of the vehicle body column which will then bend open in the event of a head impact and release the fastening plate.

Other objects, advantages and novel features of the present invention will become apparent from the following detailed description of the invention when considered in conjunction with the accompanying drawings.

BRIEF DESCRIPTION OF THE DRAWINGS

FIG. 1 is a diagrammatic exploded perspective representation of an arrangement for a belt level adjuster constructed according to a preferred embodiment, with components illustrated separately;

FIG. 2 is a vertical sectional view of the assembled arrangement of FIG. 1;

DETAILED DESCRIPTION OF THE DRAWINGS

Figure 3:
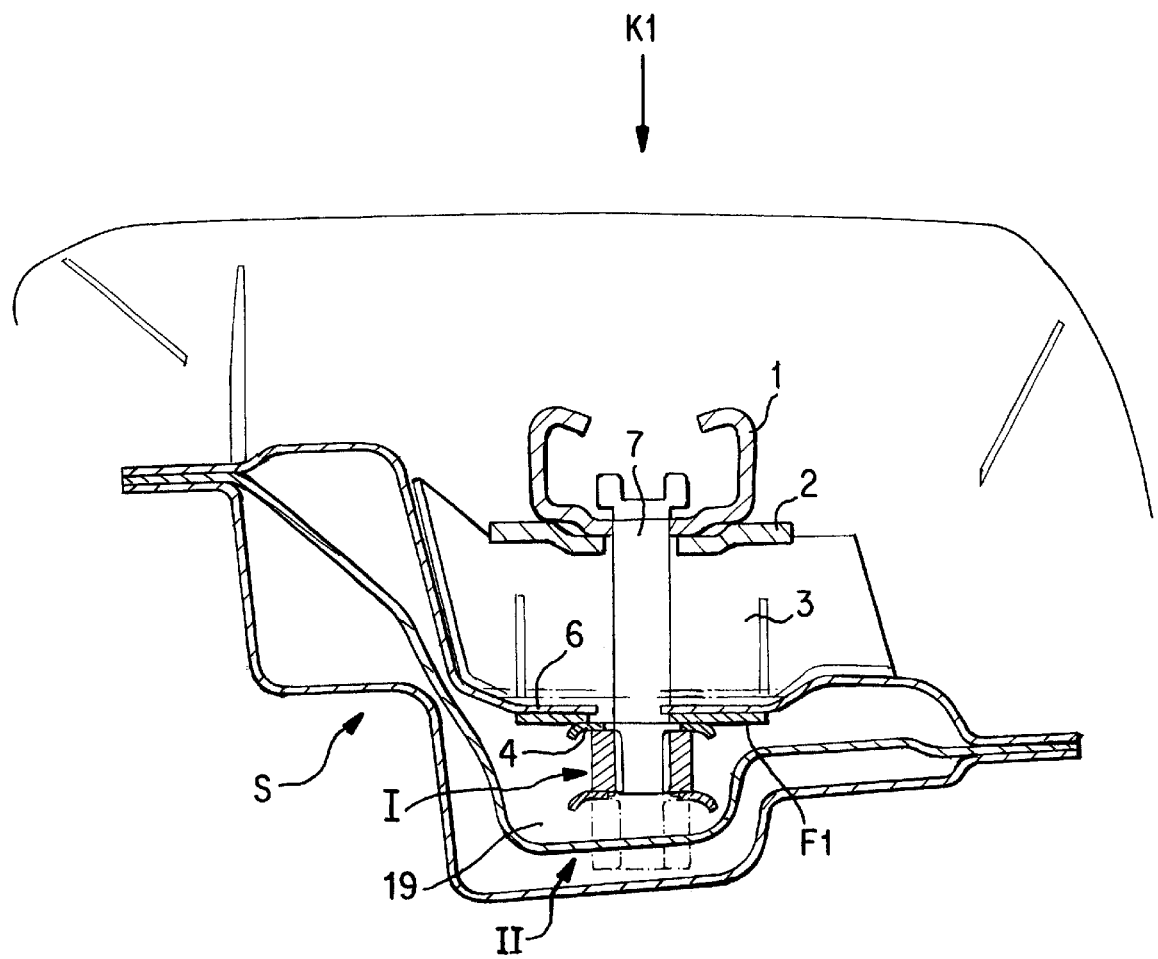
FIG. 3 is a horizontal sectional view of a column of the vehicle body and the embodiment of FIGS. 1 and 2, shown in an operating position and in a head impact position.

FIG. 1 illustrates an arrangement for receiving a belt level adjuster with its individual components, including a detent rail 1; a carrier plate 2; a deformation element 3; as well as a fastening plate 4. The schematic representation of FIG. 1 illustrates a column wall 6 of a B- or C-column of a vehicle body structure between the fastening plate 4 and the deformation element.

Figure 4:
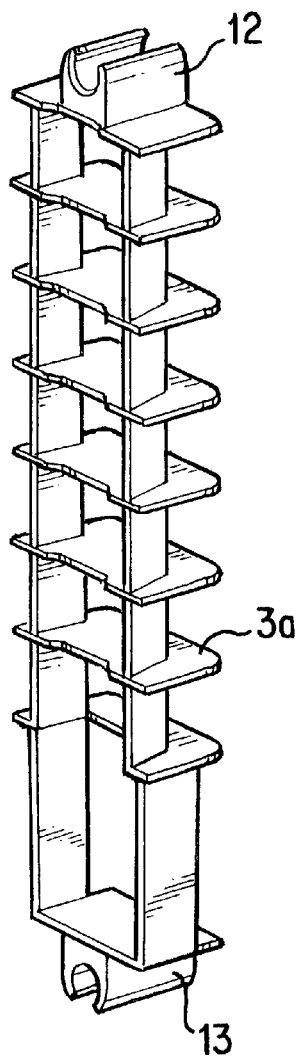
FIG. 4 is a diagrammatic perspective representation of a plastically deformable rib body as a first embodiment of a deformation element for the arrangement of the present invention.
Figure 5:
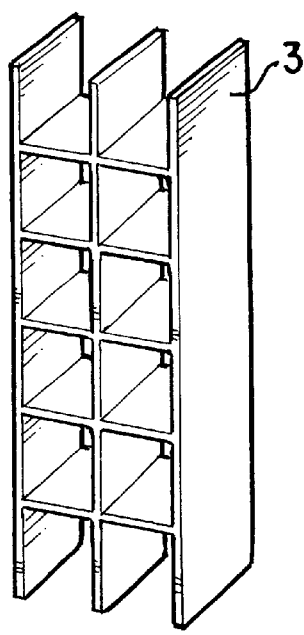
FIG. 5 is a diagrammatic perspective representation of another embodiment of a plastically deformable rib body as a further embodiment of a deformation element for the arrangement. of the present invention.
Figure 6:
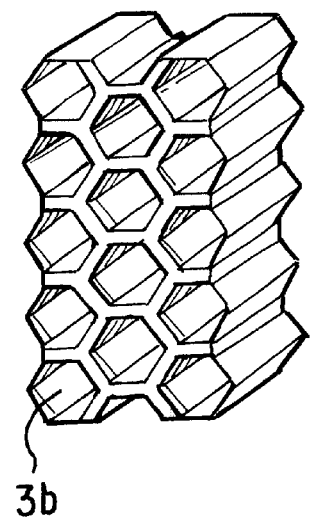
FIG. 6 is a diagrammatic perspective representation of a plastically deformable honeycomb body as a further embodiment of a deformation element for the arrangement of the present invention.
Figure 10:
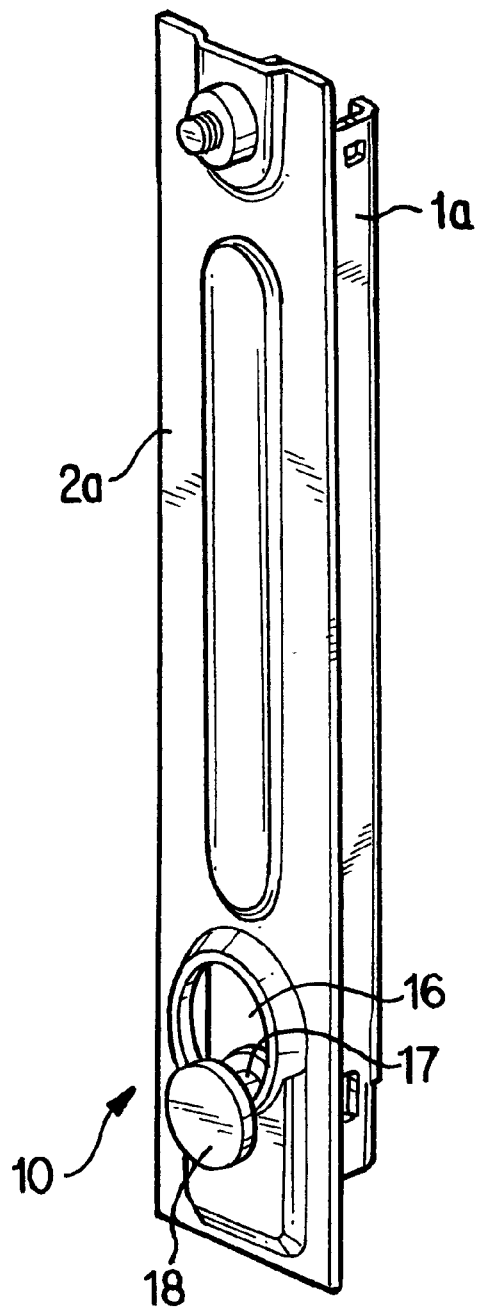
FIG. 10 is a view of a carrier plate having a keyshaped receiving device for an electric belt level adjuster, constructed according to a preferred embodiment of the present invention.

FIG. 10 shows a detent rail 1a and carrier plate 2a. FIGS. 4–6 show respective different deformation elements 3a; 3 and 3b.

The actual belt level adjuster (not shown) is vertically adjustably arranged in the detent rail 1; 1a (FIG. 10). The entire arrangement is arranged in an indentation of the column S (FIG. 3) and is connected with the column by way of screws 7,8.

The detent rail 1; 1a with the carrier plate 2; 2a is held with the interposition of the deformation element 3; 3a; 3b on the column wall 6 of the vehicle body by the fastening plate 4. In the mounted condition, that is, in the operating or installed position I of FIG. 3, this fastening plate 4 is held to be resting on a surface F1 of the column wall 6 which faces away. In a head impact position II, that is, after a head impact, the fastening plate 4 is arranged to be detached from the surface F1 which faces away. This method of operation is achieved in that the carrier plate 2; 2a is held by way of at least one continuous screw 7—in the embodiment of FIG. 1, two screws 7, 8 are used—on the column wall 6 by the fastening plate 4, the screws 7,8 being held in weld nuts 7a, 8a which are fixedly connected with the plate 4.

By way of the upper fastening screw 7 as well as by way of a hook-in connection 9; 10, the detent rail 1; 1a is connected with the carrier plate 2; 2a.

In the event of a head impact in the direction of the arrow K1, as indicated in FIG. 3, while the deformation of the element 3 takes place, the screw 7 or screws 7, 8 can be displaced into a clearance 10 of the vehicle body column S while taking along the fastening plate 4. During this displacement, only the deformation element 3 is damaged and can be exchanged in a simple manner.

As illustrated in the embodiments of the additional FIGS. 4 and 6, the deformation element 3 can consist either of a geometrically modified grid system 3a or of a honeycomb body 3b.

The deformation element 3; 3a; 3b preferably consists of a plastically deformable rib or honeycomb body, the ribs R extending approximately at a right angle with respect to the carrier plate 2; 2a, being spaced with respect to one another and forming hollow spaces H between one another.

Figure 7:
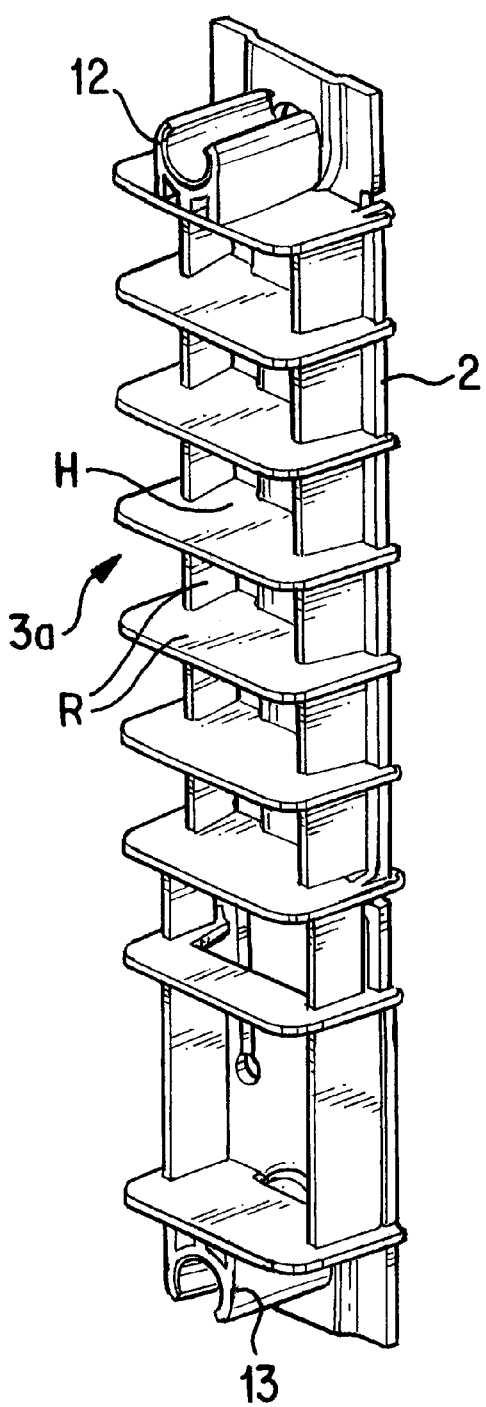
FIG. 7 is a perspective view of an assembly unit of an arrangement consisting of a deformation element and of a carrier plate for the detent rail, constructed according to a preferred embodiment of the present invention.
Figure 8:
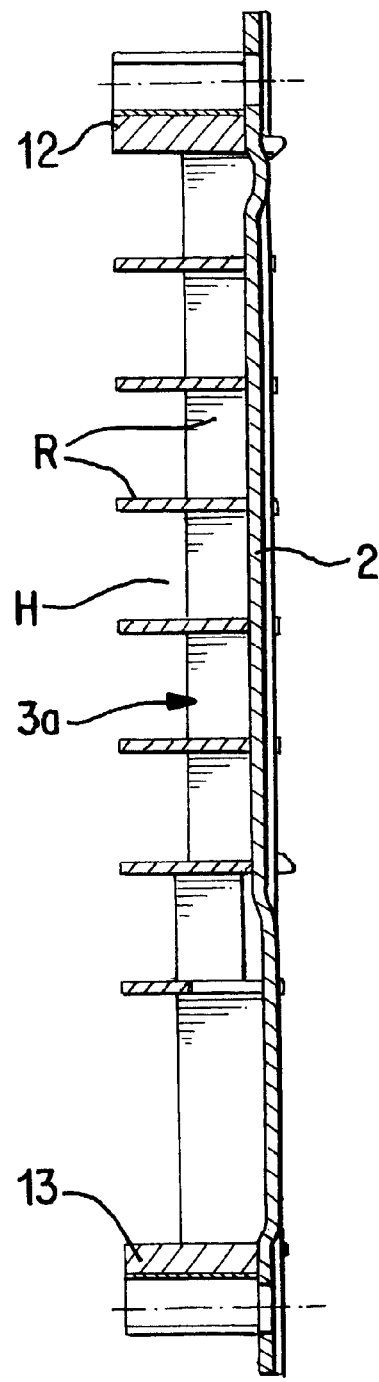
FIG. 8 is a lateral secional view of the assembly unit according to FIG. 7.

According to FIG. 7, the deformation element can be constructed either in one piece with the carrier plate 2; 2a, or, as illustrated by the embodiment, can be connected with the carrier plate 2; 2a by way of fastening clips or similar connection devices.

The deformation element 3a preferably has receiving devices 12, 13 for the screws 7, 8. These receiving devices can also be provided in the case of the deformation element 3; 3b according to FIGS. 1, 5 and 6.

Figure 9:
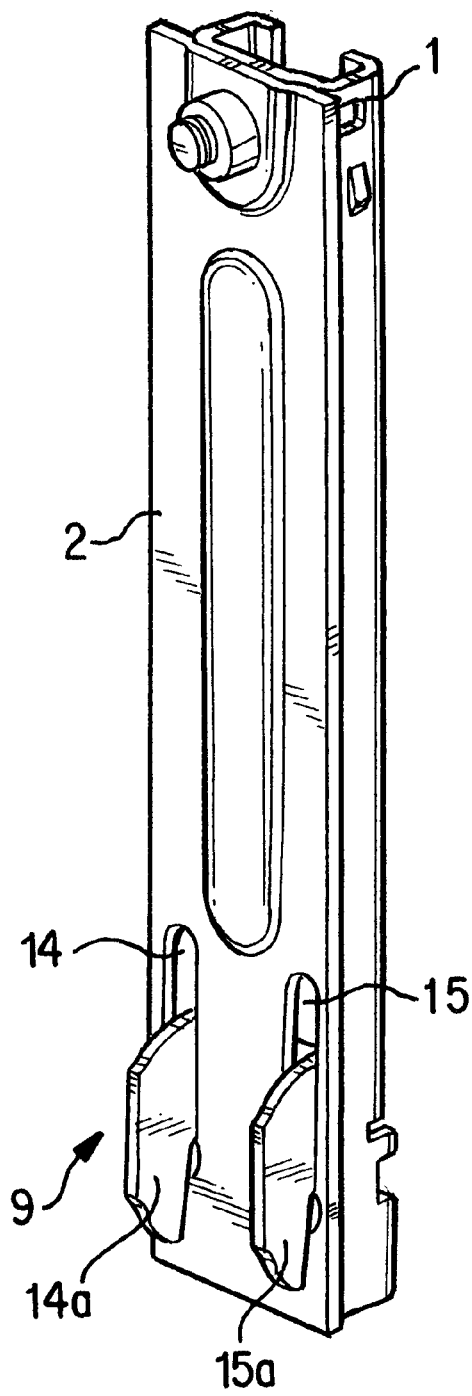
FIG. 9 is a perspective view of a carrier plate having longitudinal slots for a mechanical belt level adjuster, constructed according to a preferred embodiment of the present, invention.

FIGS. 9 and 10 show embodiments of two carrier plates 2; 2a, so-called adapter plates, with various possibilities of hooking in the detent rails 1; 1a. Thus, the carrier plate 2 (FIG. 9) is provided with two longitudinal slots 14, 15 situated side-by-side, into which hooks 14a, 15a of the detent rail 1 can be hooked and represent a hook-in connection 9 according to FIG. 1. A lower portion of the deformation element 3 is located between the longitudinal slots 14, 15.

In FIG. 10, the carrier plate 2a is provided with a key-shaped opening 16, into which a pin 17 engages which has a head 18 and represents another hook-in connection 10.

Figure 11:
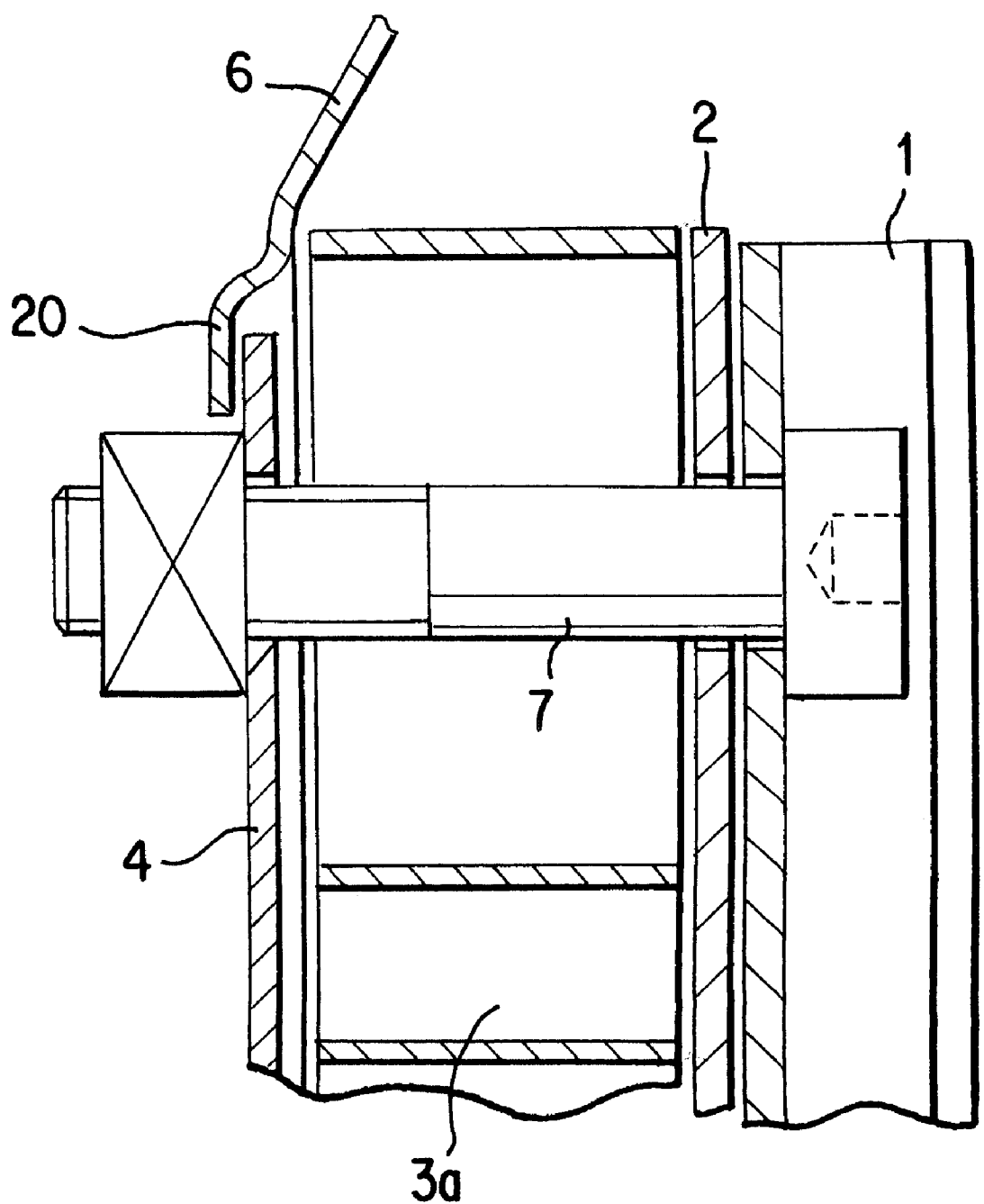
FIG. 11 is a partial lateral sectional view of a fastening plate with column lugs, constructed according to a preferred embodiment of the present invention.

According to another embodiment illustrated in FIG. 11, a punched-out lug 20 in the column wall 6 reaches around an upper end of the fastsening plate 4, so that the position of the fastening plate 4 can be secured. The reaching-around can take place on both the upper and lower ends, on one end or laterally.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for a belt level adjuster of a safety belt system, which adjuster is arranged on a column of a vehicle, and a deformation element is arranged between a detent rail of the belt system and the column, wherein the detent rail is supported by a carrier plate with the deforming element held between the carrier plate and a column wall of the vehicle by way of a fastening plate, and this fastening plate, in a mounted operating position is arranged resting against a wall surface of the column wall facing away from an interior column wall and, in a head impact position, is moved away from this wall surface of the column wall 2. Arrangement according to claim 1, wherein the detent rail with the carrier plate is connected by way of continuous screws to the column wall, the detent rail is connected to the carrier plate only by way of at least one hook-in connection, and the screws are screwed into weld nuts on the fastening plate.

3. Arrangement according to claim 2, wherein the carrier plate, as the hook-in connection, has at a lower end at least one longitudinal slot which engages with at least one protruding hook on the detent rail.

4. Arrangement according to claim 3, wherein the hook-in connection includes two longitudinal slots in the lower end of the carrier plate, and a portion of the deformation element is located between the slots.

5. Arrangement according to claim 2, wherein the carrier plate, as the hook-in connection has at a lower end at least one key-shaped opening which engages with at least one pin element on the detent rail, and the pin element has a detent head.

6. Arrangement according to claim 2, wherein the hook-in connection includes two longitudinal slots in the lower portion of the carrier plate, and a portion of the deformation element is located between the slots.

7. Arrangement according to claim 1, wherein the deformation element consists of a plastically deformable rib body, and ribs of the rib body extend approximately at a right angle with respect to the column wall and the carrier plate and are spaced with respect to one another and form hollow spaces between one another.

8. Arrangement according to claim 5, wherein the deformation element has at least one molded-on receiving device for a fastening screw to be connected with the column wall.

9. Arrangement according to claim 1, wherein the deformation element consists of a plastically deformable honeycomb body.

10. Arrangement according to claim 1, wherein the deformation element has at least one molded-on receiving device for a fastening screw to be connected with the column wall.

11. Arrangement according to claim 1, wherein a lug of the column wall, which is bent open in the event of a head impact reaches around an upper or lower end of the fastening plate.

12. Arrangement according to claim 1, wherein the carrier plate is connected by way of detent devices with the deformation element and forms a component.

13. A vehicle safety belt adjuster assembly for a vehicle. having a vehicle pillar with a hollow space therein, comprising:

a fastening plate disposed in the hollow space of the vehicle pillar at a first side of a vehicle pillar wall, a deformation element disposed at a second side of the vehicle pillar wall which faces a vehicle passenger space, a belt system detent rail, and a carrier plate supporting the detent rail, said carrier plate abuttingly engaging the deformation element at a selement of the deformation ide facing the passenger space, wherein said fastening plate is movable into the pillar hollow space at said first side of the pillar wall in response to a passenger head impact against said detent rail causing deformation of said deformation element.

14. A vehicle safety belt adjuster assembly according to claim 13, comprising at least one continuous screw extending through the detent rail and operable to detachably clamp the detent rail, carrier plate, and deformation element with the fastening plate.

15. A vehicle safety belt adjuster assembly according to claim 13 comprising:

a first continuous screw extending through the detent rail and operable to detachably clamp the detent rail, carrier plate, and deformation element with the fastening plate, and a second continuous screw extending through the carrier plate at a position spaced from the first screw and operable to detachably clamp the carrier plate with the fastening plate.

16. A vehicle safety belt adjuster assembly according to claim 15, comprising a hook-in connection between one end of the detent rail and the carrier plate.

17. A vehicle safety belt adjuster assembly according to claim 16, wherein said fastening plate includes threaded parts which threadably engage with the screws.

18. A vehicle safety belt adjuster assembly according to claim 17, wherein the hook-in connection includes a longitudinal slot at an end of the carrier plate and a protruding hook on the detent rail which is detachably engageable in said longitudinal slot.

19. A vehicle safety belt adjuster assembly according to claim 17, wherein the hook-in connection includes a key-shaped opening at an end of the carrier plate and a protruding pin element on the detent rail which is detachably engageable in said key-shaped opening.

20. A vehicle safety belt adjuster assembly according to claim 15, wherein said fastening plate includes threaded parts which threadably engage with the screws.

* * * * *